United States Patent [19]
Piemont

[11] 3,711,588
[45] Jan. 16, 1973

[54] CORRUGATED EDGING FOR AN ENDLESS CONVEYOR

[76] Inventor: Georges Piemont, 7 rue Rabelais, Vanves, France

[22] Filed: Feb. 2, 1971

[21] Appl. No.: 111,931

[30] Foreign Application Priority Data

Feb. 6, 1970 France..................................7004198

[52] U.S. Cl. ..................264/231, 264/294, 264/296, 264/347
[51] Int. Cl. .............................................B29h 7/22
[58] Field of Search......................269/294–296, 320, 269/322, 339, 347, 286, 287, 280, 281, 236, 231

[56] References Cited

UNITED STATES PATENTS

| | | | |
|---|---|---|---|
| 2,831,215 | 4/1958 | Piemont | 264/320 X |
| 2,601,269 | 6/1952 | Fisch | 264/281 |
| 1,959,488 | 5/1934 | Meyer | 264/347 X |

*Primary Examiner*—Robert F. White
*Assistant Examiner*—Richard R. Kucia
*Attorney*—Brady, O'Boyle & Gates

[57] ABSTRACT

The invention is concerned with a method of forming corrugations in one limb of an L-shaped strip of uncured rubber to form an edge for an endless conveyor. The strip is wound around a shaper device so that the strip takes up a curved shape with the outer edge of said one limb placed under tension, and then the shaper device is operated to perform portions of said one limb into corrugations. The portions are held in the deformed positions while the strip is cured.

9 Claims, 10 Drawing Figures

PATENTED JAN 16 1973 3,711,588

INVENTOR

GEORGES PIEMONT

BY Brady, O'Boyle & Gates
ATTORNEYS

CORRUGATED EDGING FOR AN ENDLESS CONVEYOR

This invention is concerned with edges for endless conveyors.

It has already been proposed to form corrugated side edges of conveyor belts by a method in which after formation of the corrugations on one web of an L-shaped non-cured strip of elastomer, the strip was wound spirally or helically on its smooth (non-corrugated) web so that its corrugated web was curved edgewise and hence under tension, the profiled strip thus wound and held in position on a suitable cylindrical former being then placed in an oven to be cured.

The method of manufacture had the defect of causing deformation of the corrugations initially formed in its web, during manipulation of the uncured strip to wind it into the former, with the said corrugations also being subject to considerable sagging during the course of curing, due to the softening of the material, which resulted in an irregular final product.

According to the invention, a method of forming corrugations in one limb of an L-shaped strip of uncured rubber to form an edge for an endless conveyor, comprises winding the strip around a shaper device so that the strip takes up a curved shape with the outer edge of said one limb placed under tension, deforming portions of said one limb into corrugations by operation of the shaper device, holding said portions in the deformed positions, and curing the strip while said portions are held in the deformed positions.

The invention will now be particularly described with reference to the accompanying drawings in which.

With reference to the drawings, a method according to the invention comprises starting with a strip of uncured rubber having an angled (L-Shaped) section with smooth webs 1,1', and winding this strip on to a cylindrical support so that its web 1' is bent edgewise and is thus under tension, then forming and supporting along the whole length of this web a variable number of corrugations, then curing the strip.

Figure 3:
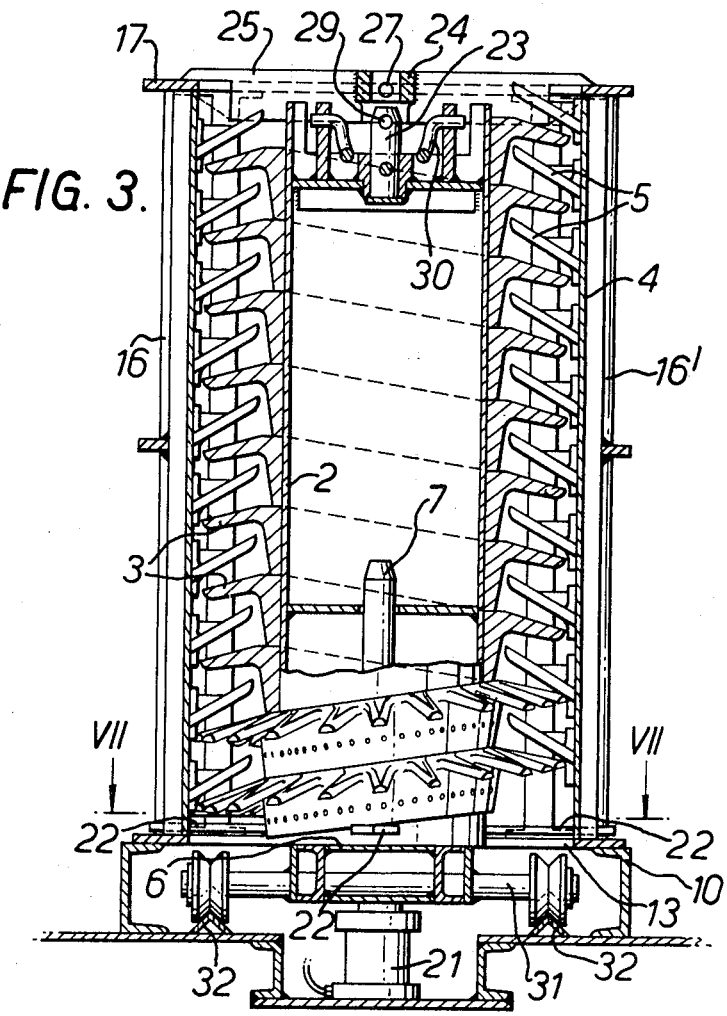
FIG. 3 is a partial vertical section, in the rest position, of a device for use in applying a method of manufacturing the corrugated strip.

According to one shaper device whereby the method may be applied, the strip of uncured elastomer is shaped in a cylindrical shaper (see FIG. 3) having one part concentrically inside another part, the central part comprising a drum 2 which is peripherally provided with radiating fingers 3, helically arranged, on which rests the web 1' of the said strip which is to be corrugated, with the other web 1 wound on the body of the drum, while the outer part comprises a cage 4 openable along a generatrix to allow insertion of the said drum, and itself having a plurality of internal fingers 5 directed towards the center and helically disposed with the same pitch as those on the drum so as to extend therebetween and between the turns they form, with the two shaper elements having means for their mutual axial and angular positioning which will be described below.

Figure 7:
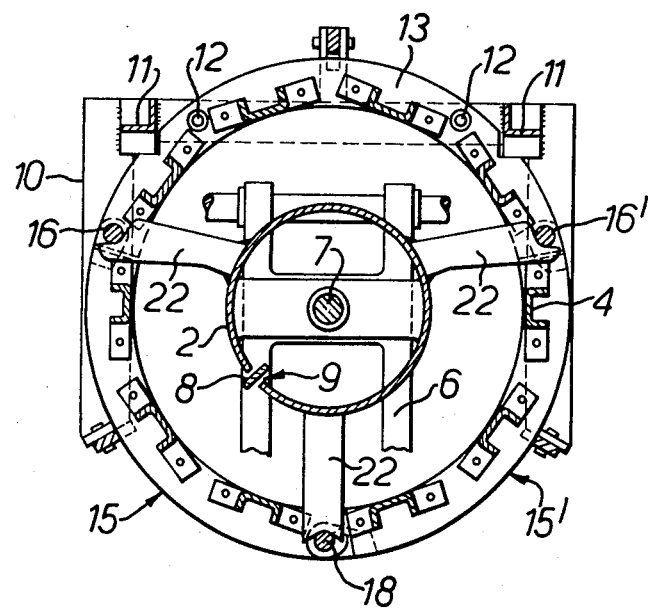
FIG. 7 is a sectional view through the base of the device taken on the line VII—VII in FIG. 3.

The inner drum 2, normally loaded with the uncured strip, is placed vertically on a support 6 provided for this purpose with a centering pin 7 and a lateral projection 8 to prevent relative angular movement of the said drum by cooperating with a lower slot 9 radial thereof (see FIG. 7).

Figure 9:
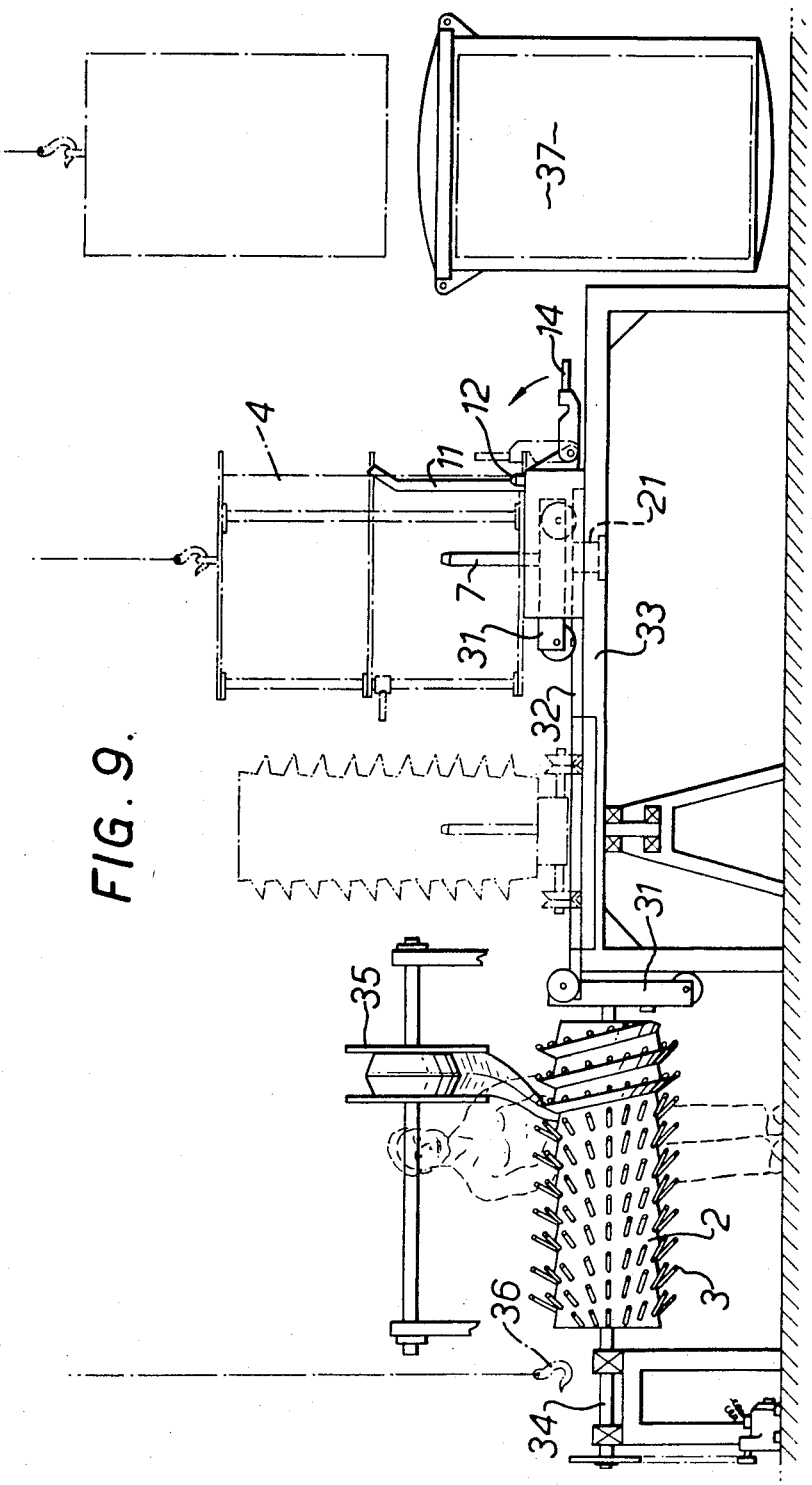
FIG. 9 and 10 are schematic views, in side elevation and in plan respectively, of a plant for use in the continuous application of a method according to the invention.
Figure 10:
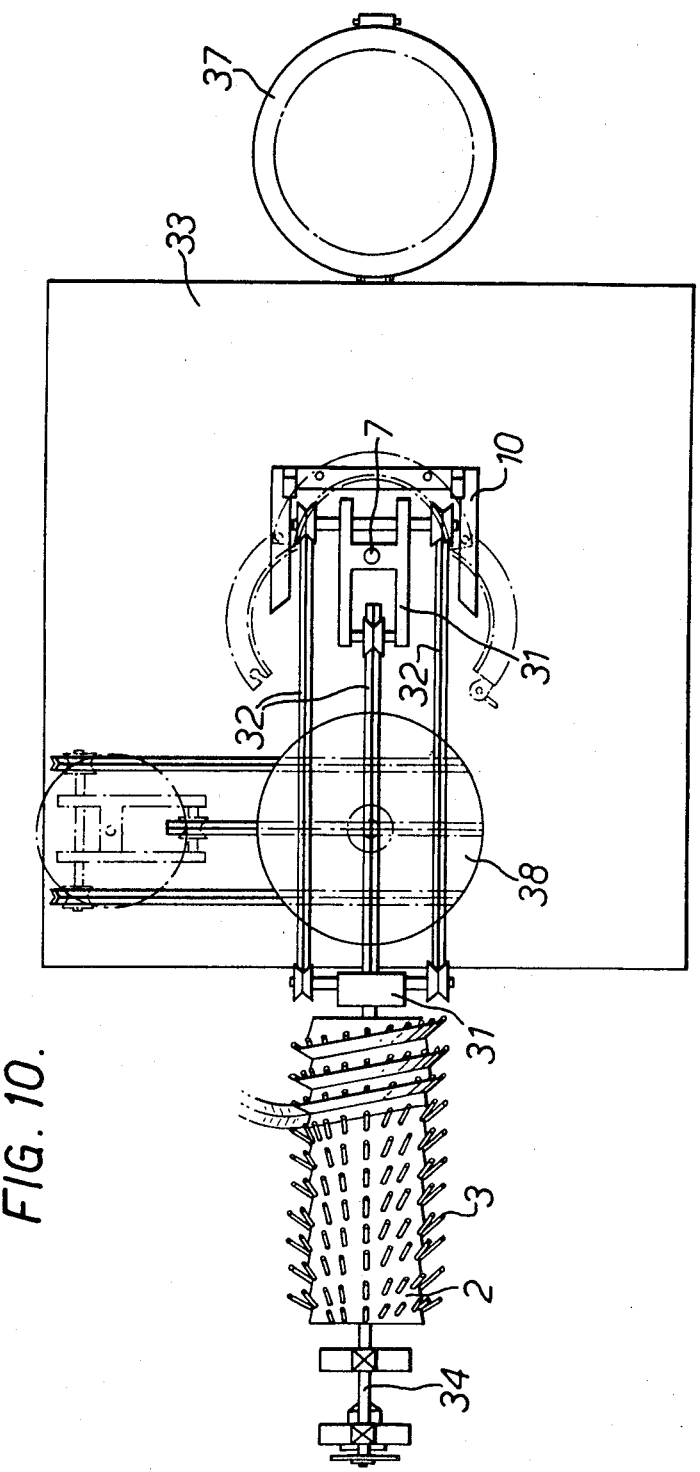

The cage 4 which surrounds the drum 2 rests on a fixed base 10 having guide uprights 11 and angular adjustment studs which can cooperate with the corresponding holes in a lower collar 13 on the said cage, and finally notched locking levers 14 for the latter (FIGS. 7, 9 and 10).

Figure 4:
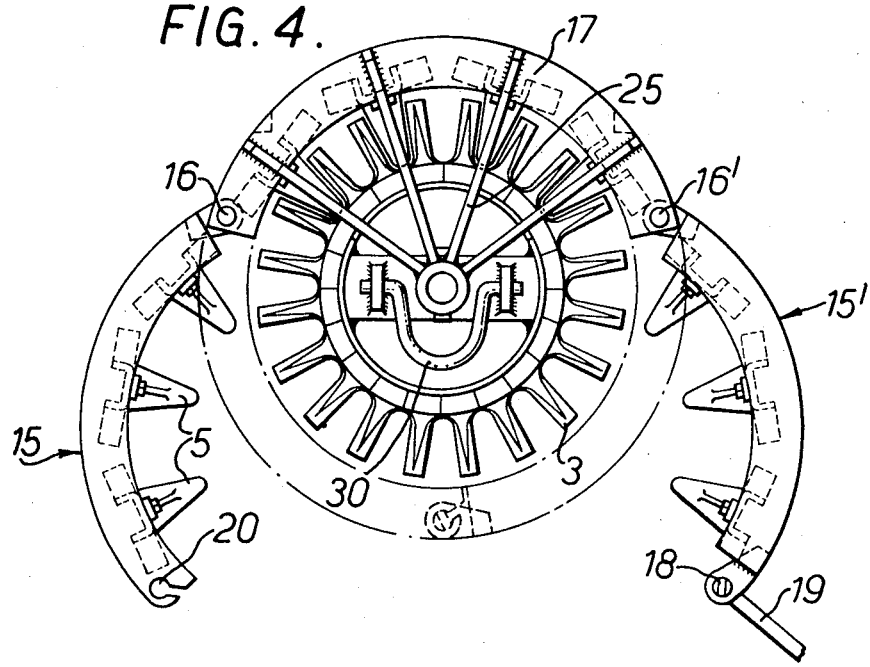
FIG. 4 is a view from above of the device, with an outer cage part in the open position.
Figure 5:
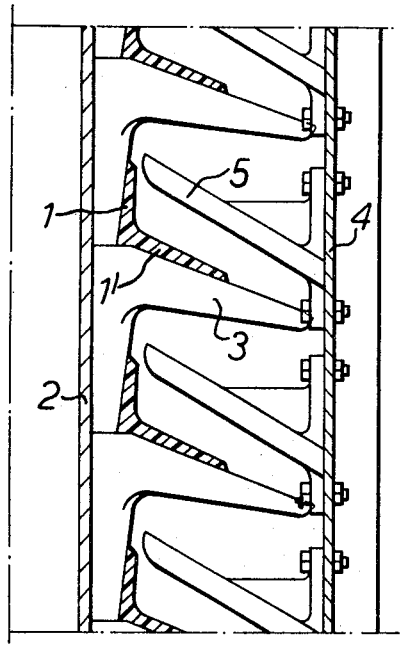
FIGS. 5 and 6 are two partial sectional views, to an enlarged scale, of parts of the device in inoperative and operative positions respectively.

The external cage 4, adapted to open along a generatrix to permit lateral insertion of the drum, has for this purpose two opening panels 15, 15' which can pivot at their ends about two columns 16, 16', substantially diametrally opposed, between the aforementioned lower collar 13 and a similar upper collar 17, the said panels being immobilized in the closed position at their adjacent free edges by a quarter turn locking mechanism comprising a column 18 rotated by a handle 19 carried on one panel, with suitable slots 20 in the other panel (FIG. 4).

Figure 6:
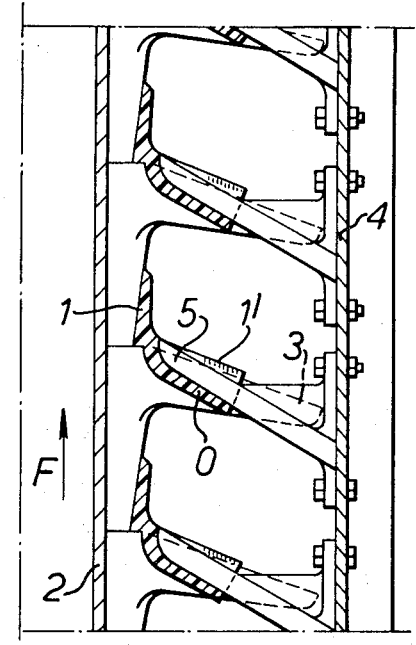

With the assembly thus arranged, the support 6, which is of the mobile type, is submitted to the action of a jack 21 moving the drum 2 axially in the direction of the arrow F (FIG. 6), in relation to the cage 4 which is closed and locked to the base 10. This causes the fingers 3 on the drum to penetrate between the fingers 5 of the cage and vice versa, with the consequent formation of corrugations O in the web 1' of the strip disposed therebetween (FIG. 6).

Figure 8:
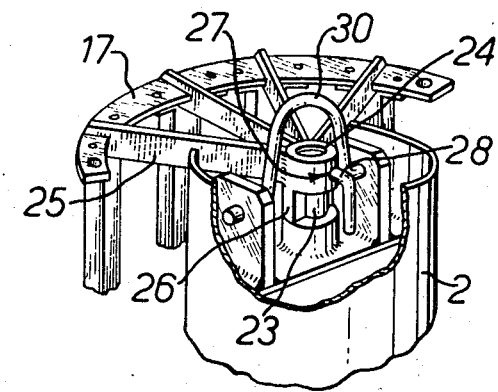
FIG. 8 is a partial sectional view, with parts removed for clarity, of the upper end of the device.

During this upward movement, to the operative position, the drum 2 may be guided on the columns 16, 16' and 18 by arms 22 radiating from its lower extremity: and simultaneously with this (axial) movement a central projection 23 integral with the upper end engages in a boss 24 carried by several radial arms 25 of the cage 4. The boss 24, cut away over half its diameter to form a lower stop and centering tail 26 for the said projection (FIG. 8), has a diametral hole 27 enabling the assembly to be locked in this position by means of a pin 28 engaged simultaneously in a corresponding hole 29 in the projection 23.

With the two elements of the shaper device thus fixed together, the corrugations O remain under permanent constraint by the fingers 3 and 5 which have formed them; the cage 4 may thus be unlocked for placing the assembly in a standard oven to cure the corrugated strip. The drum 2 has an upper lifting eye 30 for this purpose.

Figure 1:
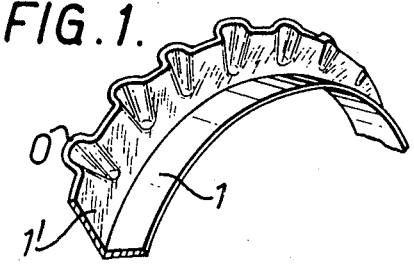
FIG. 1 shows in perspective and in curved position a length of side edge of a conveyor belt with a web corrugated under constraint by a method according to the invention
Figure 2:
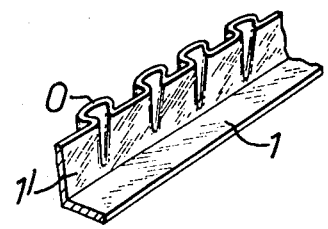
FIG. 2 is a similar view after straightening of the strip, showing gussets formed by compression of the corrugations.

After the curing, the device is removed from the oven (autoclave), then unlocked axially, and the cage 4 is opened in order to unload the drum 2 prior to a fresh usage. The corrugated strip thus produced in a single operation has the advantage of presenting completely regular corrugations which can retain their initial shape in spite of prolonged use. The corrugated strip is shown in FIG. 2 in a straightened condition, as in use in an upper or lower run of an endless conveyor. It will be seen that the corrugations are compressed into gussets.

Referring to FIGS. 9 and 10, there is shown a plant comprising several successive operating stations for continuous production of corrugated strip. These are: a station for mechanically winding the strip of the drum, a station for manipulating and preparing the strip in the shaper device, a curing station, and finally a station for extracting and removing the finished product. In order to avoid dead periods between each two operations, in this system two drums 2, two supports 6 and a single cage 4 are used.

In order to permit application of this method of operation, the support 6 for the drum 2 forms the floor of a carriage 31 moving on rails 32 carried by a table 33 whereon is fixed, facing the said rails, the locking base 10 for the shaper cage 4. By pivoting at one end of the table, the carriage is capable of assuming a vertical position so that its pin 7 forms a horizontal pivot enabling the drum 2 to be rotated by means of its projection 23 which is preferably coupled to a drive means 34 suitable for winding the profiled strip issuing from a supply 35. When the drum 2 is loaded and uncoupled, it is erected by a lifting device (not shown) whose hook 36 is placed in the eye 30. The said drum is suitably moved to adjust it angularly on the said carriage, which then ensures its transfer to the center of the base 10, first equipped with the cage 4 placed in opened position. After closure of the cage, the jack 21 which is placed beneath the carriage in a recess in the table is actuated, and the two shaper elements are brought together in the previously mentioned manner.

When released from the base 10, the assembly is taken by the lifting means into an oven 37 for curing the profiled strip under constraint. After curing, the assembly is recovered in the same manner and placed on the base 10 and the carriage 31. After opening of the cage, the carriage enables the drum to be moved towards a lateral removal station by means of a turntable 38.

During all these operations, the supplementary drum placed on its carriage is loaded with an uncured strip, is then uncoupled and brought upright to be directed and placed inside the cage 4 resting on its base 10. As soon as this carriage carrying the drum loaded with the strip has entered the cage 4, the carriage left waiting at the removal station and fitted with its empty drum is sent by means of the turntable towards the strip winding station, and the cycle starts again.

Finally it should be noted that the axial movement of drum 2 may be adjusted according to the desired depth of the impressed corrugations, which depends on the type of edge being made.

The present invention is naturally not limited to the embodiment described and shown, and covers all variations in shape, materials and dimensions.

Thus inter alia the shaper cage may be closed round its entire periphery; in this case the insertion and removal of the drum loaded with strip is effected by screwing and unscrewing.

I claim:

1. A method of forming corrugations in one limb of an L-shaped strip of uncured rubber to form an edge for an endless conveyor, comprising the steps of winding the strip around a shaper device formed of two coaxial cylindrical portions comprising a central drum portion provided peripherally with helically disposed radial support fingers, and an external cage portion operable to receive the drum portion and having internal inwardly directed fingers disposed helically with the same pitch as the fingers on the drum so as to extend therebetween and between the turns they form, the drum portion being axially displaceable relative to the cage portion, so that the strip is wound onto the drum portion to take up a curved shape with the outer edge of said one limb placed under tension; supporting said one limb by the drum portion fingers; axially displacing the drum portion relative to the cage portion so that the drum portion fingers penetrate between the cage portion fingers thereby deforming portions of said one limb of the strip into corrugations; holding said portions in the deformed positions; and curing the strip while said portions are held in the deformed positions.

2. A method according to claim 1, in which the shaper device has means for guidance, angular adjustment concentricity and locking of the drum and cage portions during relative movement of the drum portion.

3. A method according to claim 2, in which the drum portion loaded with the uncured strip is placed vertically on a mobile support having a pin for centering the lower end of the drum portion, and the support also having a lateral projection which at the same time controls the angular position of the drum portion by cooperating with a radial notch on said drum portion while the outer cage portion rests on a fixed base provided with guide uprights, with annular locking studs adapted to cooperate with corresponding holes in a lower collar on said cage portion, and finally with locking levers for said cage portion.

4. A method according to claim 1, in which the cage portion has two panels adapted to pivot at their ends on two substantially diametrally opposite columns, said panels having a device for locking in the closed position consisting of a third column with an operating handle pivoted on the free edge of one panel and adapted to cooperate with suitable slots in the other panel.

5. A method according to claim 3, in which the axial movement of the drum portion is effected by means of a jack after the cage portion has been locked to its base.

6. A method according to claim 4, in which during its movement the drum portion is guided on said columns for pivoting and locking the cage panels by means of radial arms carried at one end of the drum portion, and also the other end by a central projection which enters a boss integrally carried by the upper radial arms of said cage portions.

7. A method according to claim 6, in which at the end of the axial movement of the drum portion its upper projection is keyed into the cage portion boss by means of a pin, prior to unlocking the cage for conveying the shaper device towards a curing device.

8. A method according to claim 3, in which the drum support comprises a carriage adapted to move on the rails of a table whereon is affixed the base for receiving the cage portion, said carriage being adapted to adopt at one end of the said table a vertical position so that its horizontally disposed pin permits mechanical rotation of the drum portion for winding the uncured strip, said drum portion being driven at the projection from its other end by means of a coupling device, the installation comprising in succession a station for manipulating and preparing the shaper device, a curing station, a station for removing the finished product and lifting means enabling all the transfer operations to be effected.

9. A method according to claim 1, in which a peripherally closed outer cage portion is used, and insertion and removal of the drum portion are effected at one end of said cage portion by screwing and unscrewing.

* * * * *